United States Patent
Eccles, Jr.

(10) Patent No.: US 6,836,973 B1
(45) Date of Patent: Jan. 4, 2005

(54) VERSA LEVEL

(76) Inventor: Thomas Eccles, Jr., 107 Brunswick Ave., Lebanon, NJ (US) 08833

( * ) Notice: Subject to any disclaimer, the term of this patent is extended or adjusted under 35 U.S.C. 154(b) by 0 days.

(21) Appl. No.: 10/423,755

(22) Filed: Apr. 24, 2003

Related U.S. Application Data

(60) Provisional application No. 60/376,331, filed on Apr. 30, 2002.

(51) Int. Cl.$^7$ ................................................ G01C 9/26
(52) U.S. Cl. ............................................ 33/374; 33/382
(58) Field of Search .......................... 33/379, 381, 382, 33/383, 374

(56) References Cited

U.S. PATENT DOCUMENTS

| | | | | |
|---|---|---|---|---|
| 740,742 A | * | 10/1903 | Bush ............................. | 33/374 |
| 830,796 A | * | 9/1906 | Masters ......................... | 33/374 |
| 885,658 A | * | 4/1908 | Abrahams ...................... | 33/374 |
| 935,807 A | | 10/1909 | Oswald ......................... | 33/383 |
| 986,001 A | * | 3/1911 | Hendrickson ................. | 33/383 |
| 1,029,744 A | | 6/1912 | Desilets ........................ | 33/383 |
| 1,489,239 A | * | 4/1924 | Eagan ........................... | 33/374 |
| 1,712,201 A | * | 5/1929 | Deneen ......................... | 33/381 |
| 1,777,429 A | * | 10/1930 | Charlton ....................... | 33/381 |
| 1,844,762 A | * | 2/1932 | Hilton ........................... | 33/374 |
| 2,502,235 A | * | 3/1950 | Schultes et al. .............. | 33/381 |
| 2,559,961 A | | 7/1951 | Howell ......................... | 33/374 |
| 2,752,692 A | * | 7/1956 | Smith ........................... | 33/374 |
| 2,807,888 A | * | 10/1957 | Thomas ........................ | 33/374 |
| 2,906,031 A | * | 9/1959 | Rice .............................. | 33/382 |
| 3,820,249 A | * | 6/1974 | Stone ........................... | 33/382 |
| 3,889,353 A | * | 6/1975 | Provi ............................ | 33/381 |
| 4,099,331 A | * | 7/1978 | Peterson et al. .............. | 33/374 |
| 5,881,468 A | * | 3/1999 | Baumann ...................... | 33/383 |

* cited by examiner

*Primary Examiner*—G. Bradley Bennett
(74) *Attorney, Agent, or Firm*—Matthew J. Peirce

(57) ABSTRACT

A tool for household, commercial, and industrial use is disclosed. The tool would be a multi-sectional level that would comprise many individual sections that would be pivotally attached to one another, with each section having a cylinder and a volume of liquid in the cylinder. Each cylinder would also have an internal bubble for use in measuring flat surfaces. The level could also be placed in a slide-lock mechanism to force the level into a straight shape. Either one or two slide-lock mechanism could be used with the level.

4 Claims, 1 Drawing Sheet

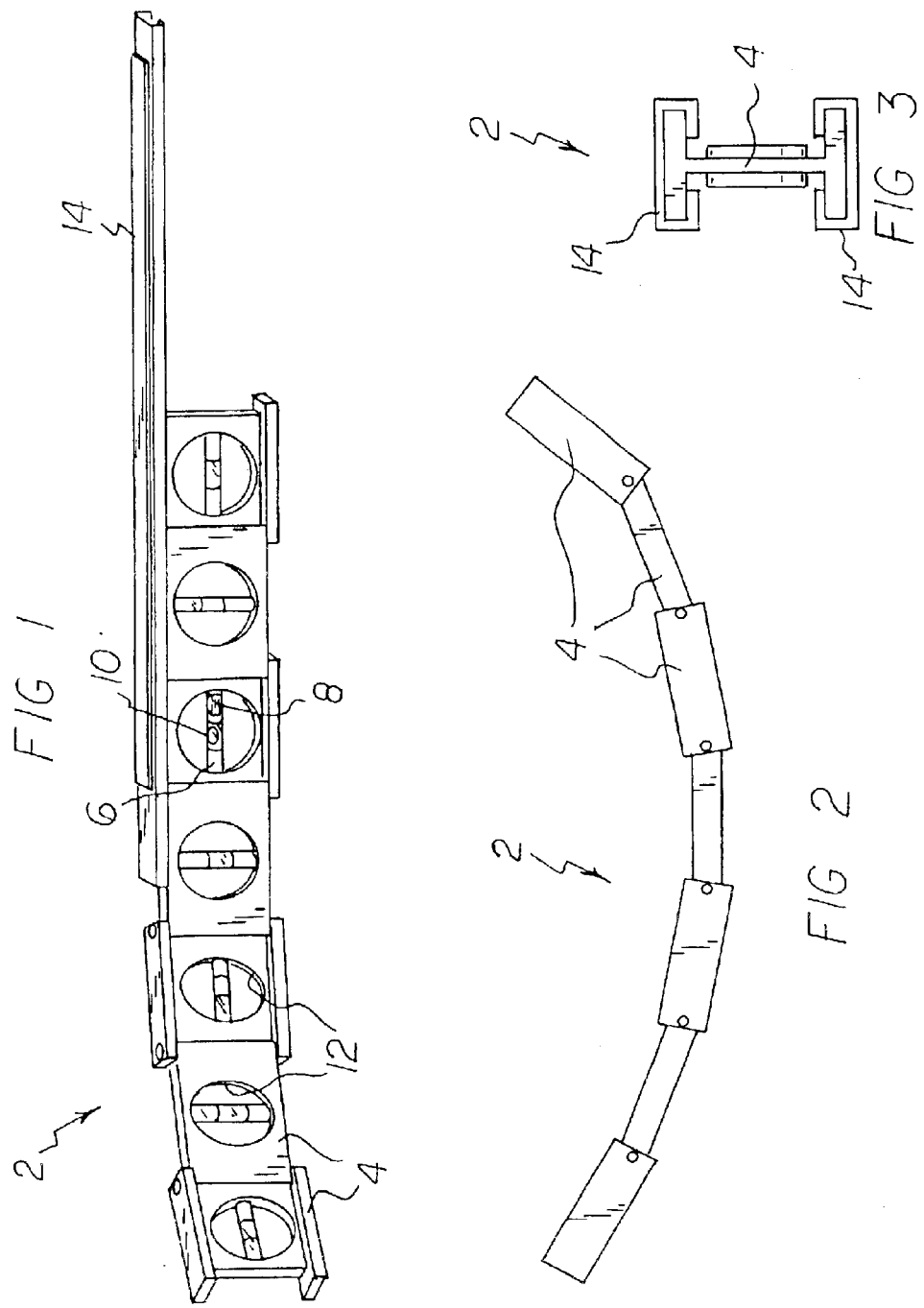

VERSA LEVEL

This application claims benefit of No. 60/376,331 filed Apr. 30, 2002.

I. BACKGROUND OF THE INVENTION

The present invention concerns that of a new and improved tool for household, commercial, and industrial use.

II. DESCRIPTION OF THE PRIOR ART

U.S. Pat. No. 2,559,961, issued to Howell, discloses a flexible level comprised of a series of links that are jointed together for angular work.

U.S. Pat. No. 1,029,744, issued to Desilets, discloses an additional leveling tool.

U.S. Pat. No. 935,961, issued to Oswald, discloses an additional leveling tool.

III. SUMMARY OF THE INVENTION

The present invention concerns that of a new and improved tool for household, commercial, and industrial use. The tool would be a multi-sectional level that would comprise many individual sections that would be pivotally attached to one another, with each section having a cylinder and a volume of liquid in the cylinder. Each cylinder would also have an internal bubble for use in measuring flat surfaces. The level could also be placed in a slide-lock mechanism to force the level into a straight shape. Either one or two slide-lock mechanism could be used with the level.

There has thus been outlined, rather broadly, the more important features of a multi-sectional level that the detailed description thereof that follows may be better understood and in order that the present contribution to the art may be better appreciated. There are, of course, additional features of the multi-sectional level that will be described hereinafter and which will form the subject matter of the claims appended hereto.

In this respect, before explaining at least one embodiment of the multi-sectional level in detail, it is to be understood that the multi-sectional level is not limited in its application to the details of construction and to the arrangements of the components set forth in the following description or illustrated in the drawings. The multi-sectional level is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present multi-sectional level. It is important, therefore, that the claims be regarded as including such equivalent constructions insofar as they do not depart from the spirit and scope of the present invention.

It is therefore an object of the present invention to provide a multi-sectional level which has all of the advantages of the prior art and none of the disadvantages.

It is another object of the present invention to provide a multi-sectional level which may be easily and efficiently manufactured and marketed.

It is another object of the present invention to provide a multi-sectional level which is of durable and reliable construction.

It is yet another object of the present invention to provide a multi-sectional level which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 shows a perspective view of the level.

FIG. 2 shows a top view of the level.

FIG. 3 shows a side view of the level.

V. DESCRIPTION OF THE PREFERRED EMBODIMENT

Priority is hereby claimed to application No. 60/376,331, filed on Apr. 30, 2002.

FIG. 1 shows a perspective view of the level 2. Level 2 would comprise a plurality of individual sections 4 that would be approximately square-shaped. Each section has two ends, a first end and a second end, each section also having a height and a width that are the same, each section having two surfaces, a top surface and a bottom surface, and furthermore, each section also having a depth.

Each section 4 would have a hollowed-out circle 12 located in the middle of each section, with each circle 12 having a perimeter. Each section also includes an individual cylinder 6 of fluid 8 with an internal bubble 10. Each cylinder has two ends, a first end and a second end, the first end and the second end of each cylinder fixedly attached to the perimeter of a particular hollowed-out circle 12. The cylinders 6 would alternatively be positioned within each section 4 vertically and horizontally, as measured in relation to the bottom surface of each section 4.

Each section 4 would have two ends, a first end and a second end. The first end and the second end of each section 4 would be pivotally attached to another section, except for the two sections 4 on the either end of level 2, which would only be attached to one adjacent section 4.

Level 2 would normally be flexible, allowing level 2 to be wrapped into a semicircle or a circle. However, the present invention would also come with slide-lock mechanism 14 that would serve as a rigid track in which to position level 2 into a straight line. A user would take either the top surface or the bottom surface of all sections 4 on the level 2 and place the appropriate surface into the mechanism 14, thereby removably attaching the entire level 2 within the mechanism and forcing level 2 to actually be straight like levels usually are.

The number of sections 4 of level 2 is shown in FIG. 1 to be seven. However, the number of sections 4 with level 2 shown in this figure is not meant to be limiting. A wide variety of sections 4 could be present in level 2 with level 2 still falling under the scope of patent protection defined in this application.

FIG. 2 shows a top view of the level as it would appear not attached to the mechanism 14. As can be seen, the individual sections 4 on the level 2 are pivotally attached to one another, allowing the level 2 to be placed in a semicircle or a circle.

FIG. 3 shows a side view of the level 2. In this diagram, there are two separate mechanisms 14, one used to mount the top surfaces of all sections 4 on the level 2, while the second mechanism 14 is used to mount all the bottom surfaces of all sections 4 on the level 2. Only one mechanism 14 would actually be needed to properly force all sections 4 on the level 2 into a straight line, but two mechanisms 14 in use with a particular level 2 would provide extra added support.

Locking mechanism 14 could also be used as an accessory attachment. Certain accessories that would be attached to the end of the level 2 could include a laser, a magnet, or other accessories that might be useful when in used in combination with a level 2.

I claim:

1. A multi-sectional level comprising:
   (a) a plurality of sections, each section having two ends, a first end and a second end, each section having a height and a width that are the same, each section having two surfaces, a top surface and a bottom surface, each section also having a depth, the first end and second end of each section being pivotally attached to adjacent sections, except for the two sections located on either end of the plurality of sections, which are attached to only one adjacent section,
   (b) a hollowed-out circle located in the middle of each section,
   (c) a plurality of cylinders, each cylinder having two ends, a first end and a second end, the first end and the second end of each cylinder fixedly attached to the perimeter of a particular hollowed-out circle,
   (d) a volume of fluid located within each cylinder,
   (e) a bubble located within each volume of fluid,
   (f) means for placing the plurality of sections into a straight line.

2. A multi-sectional level according to claim 1 wherein each cylinder that is fixedly attached to the perimeter of a particular hollowed-out circle is affixed either vertically or horizontally in relation to the bottom surface of each section.

3. A multi-sectional level according to claim 2 wherein each cylinder that is fixedly attached to the perimeter of a particular hollowed-out circle is affixed exactly ninety degrees different than every other cylinder that is located in a section immediately adjacent to the cylinder.

4. A multi-sectional level according to claim 3 wherein the means for placing the plurality of sections into a straight line further comprises
   (a) a mounting bracket having two surfaces, an inner surface and an outer surface, the mounting bracket being straight,
   (b) wherein either the top surface or the bottom surface of the plurality of sections is removably attached to the inner surface of the mounting bracket.

* * * * *